June 4, 1968    W. J. BILLERBECK, JR., ETAL    3,387,199
CHARGE CONTROL SYSTEM FOR SATELLITE BATTERIES
Filed Dec. 2, 1965
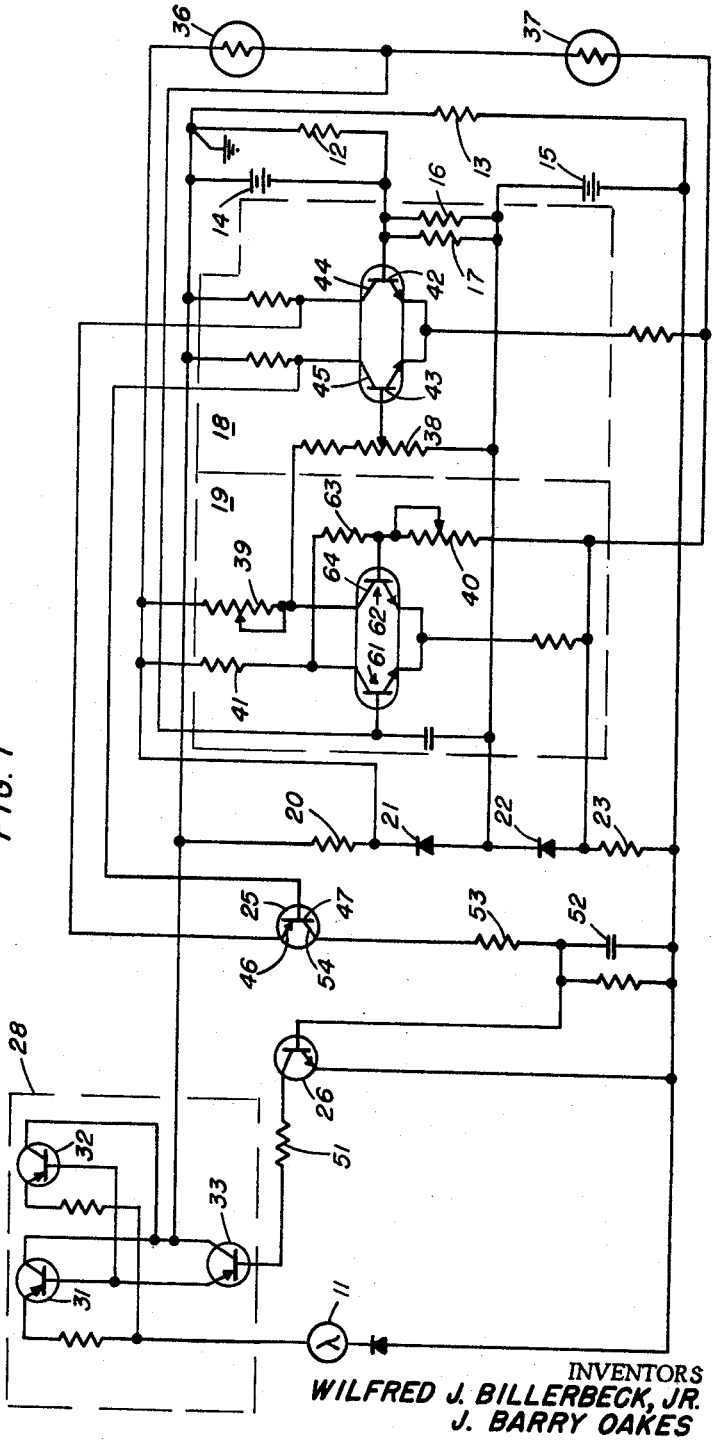
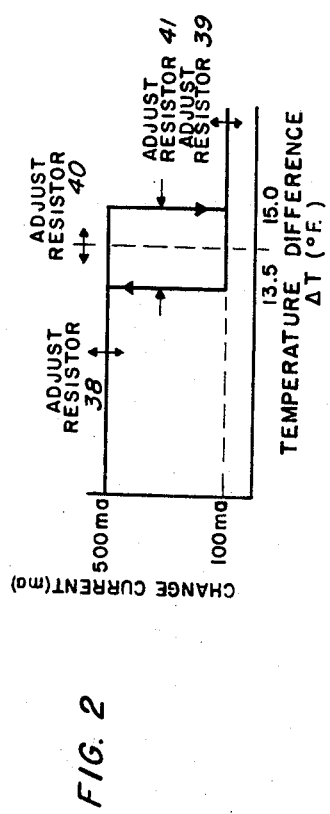
INVENTORS
WILFRED J. BILLERBECK, JR.
J. BARRY OAKES
BY *Claude Funkhouser* ATTORNEY
*Leonard L. Lowrie* AGENT United States Patent Office 3,387,199
Patented June 4, 1968

3,387,199
CHARGE CONTROL SYSTEM FOR SATELLITE BATTERIES
Wilfred J. Billerbeck, Jr., and J. Barry Oakes, Silver Spring, Md., assignors to the United States of America as represented by the Secretary of the Navy
Filed Dec. 2, 1965, Ser. No. 511,587
3 Claims. (Cl. 320—32)

ABSTRACT OF THE DISCLOSURE

A charge limiter for controlling the charging of nickel cadmium batteries in a solar cell powered satellite. The device is a constant current, series, limiter which senses battery charge current and utilizes this measurement to control the solar array input current. A thermistor bridge, which measures the difference between battery temperature and satellite structure temperature, switches the limiter between a high current and a low current level. In this manner the invention provides control of battery overcharge power for maintaining a charge on the battery and maintaining battery temperatures at near optimum value for long battery life.

The present invention relates to a current regulator and more in particular to a dual-level constant-current series limiter for charging batteries in a solar-cell powered satellite.

An object of the present invention is to provide a control system for maintaining the long-term battery overcharge power to a constant level.

Another object of the present invention is to provide a charge control system for a battery compensating for variations in source current and variations in load current.

A further object of the present invention is to provide control of battery overcharge power for maintaining a charge on a battery and maintaining battery temperatures at near optimum value for long battery life.

Other objects, advantages and novel features of the invention will become apparent from the following detailed description of the invention when considered in conjunction with the accompanying drawings wherein:

FIG. 1 is a schematic drawing of the charge control system of the present invention;

FIG. 2 is a graph of charge current versus temperature difference.

The need for the present invention in a satellite powered by solar cells for charging nickel-cadmium batteries is evident from a study or explanation of the characteristics of a solar cell. Primary power for operation of a satellite in space comes from silicon solar cells arranged in four panel-shaped arrays. The power from the solar cells goes through diodes to various electrical loads in the satellite and to a string of nickel-cadmium batteries connected in parallel with the electrical loads and which normally draws about 500 milliamperes. However, it is to be noted the current generating capabilities of a solar array varies from an initial value of about 3300 ma. in the position of maximum illumination by the sun to a minimum of zero ma. when the earth eclipses the satellite. With no control on the use of the power from the solar cells, the input power to the batteries would vary from a maximum of 68 watts to a minimum of zero depending on the altitude of the satellite, on the length of time in which the solar cell degradation has occurred or whether or not the sun illuminates the satellite. With these characteristics of the input power to the electrical loads of a satellite from an array of solar cells there is a requirement to minimize gas generation in the batteries by limiting the maximum overcharge current in the batteries and controlling the overcharge wattage to a reasonable constant value so that battery temperature can be held near optimum in orbit.

From the variation of the attitude and position of the satellite in space various battery charging rates are required, a low rate when the solar array is illuminated 100 percent of the time and supplying total electrical load requirements and high battery charge rates to store sufficient energy in the battery during non-hundred percent illumination of the solar cells.

Typical failures of the nickel-cadmium batteries in the environment of a satellite is due to separator breakdown caused by chemical action of electrolyte at high temperatures and excessive evolution of gas at low temperatures. For a long cyclic life with nickel-cadmium batteries in their present form, the depth of discharge must be less than about 15 to 25 percent and the case temperature must be controlled near 75 degrees F. The present invention controls the depth of discharge of a battery and provides for control of battery temperature at near-optimum levels if the orbital average overcharge power is controlled to a constant level.

The need for a closed-loop of battery charge control arises from several facts. The output of the solar array varies throughout each orbit depending upon the satellite's aspect. The exposure to sunlight of the solar cells changes from 67 to 100 percent illumination because of seasonal variations. Degradation of solar cell current and voltage is caused by bombardment of the solar cells by energetic proton and electron particles. Variation in battery efficiency during the charge-discharge cycle changes during the battery's life. The requirement for various experiments from time to time in the satellite varies the electrical load.

A satisfactory method for detecting the rapid drop in battery-charging efficiency of the nickel-cadmium battery when overcharge state is reached is to measure the power dissipated in the battery as heat. This can be done by measuring the temperature drop through a known thermal resistance when overcharge thermal energy flows from the battery to a heat sink. By obtaining signal from the heat sink, switching could be done between two current levels in the regulator. Thus, the control of the duty cycle would then regulate the average power dissipation in the batteries to a nearly constant level.

The arrangement of the present invention meets the requirements as noted above by sensing the battery charge current and limiting this current to some desired maximum value and secondly adjusting the maximum charge current in accordance with the difference between the battery and structure temperature.

Referring now to FIGURE 1, the solar cells 11 supply current to the electrical loads of the satellite connected across load resistors 12 and 13 in parallel with 8 cells of a nickel-cadmium battery and a total of 18 cells, respectively. The total nominal voltage of the nickel-cadmium battery is 24.3 volts with the positive end of the string of 18 cells grounded. Between the two strings of battery cells 14 and 15, two resistances 16 and 17 in parallel are connected between the string of cells and are used as charge current sensing resistors. Stage 18 operates as a differential amplifier with the right-hand transistor base as the signal input from the sensing resistors 16 and 17 and with the left-hand transistor base supplied with a reference voltage from a limiter control stage 19. The biasing voltage for the emitters of stage 18 is regulated by a voltage regulator having resistances 20 and 23 and Zener diodes 21 and 22 in series and connected in parallel across the 18 cells of the batteries 14 and 15. Transistor 25 provides a DC voltage level change. Transistor 26 provides current gain to drive the base of transistor 33 of the series regulator 28 comprising transistor 31 and 32 in parallel connected with transistor 33 in a Darlington configuration, that is, series connection at the input and parallel connection at the output. Thermistors 36 and 37 are mounted on the satellite structure and battery, respectively. The maximum charge current level is adjusted to 500 milliamperes by means of resistor 38 while the minimum charge level is set to 100 ma. by control 39. A differential of 15 degrees Fahrenheit is adjusted by resistance 40 and resistance 41 is chosen to provide a hysteresis of about 1° F.

In the charge control system of the present invention of FIGURE 1, the system of the present invention acts as a variable resistance element. If the current-generating capability of the solar cells is greater than the current through the electrical load in parallel with resistors 12 and 13 and the desired battery charge current, the resistance of the system increases causing solar cell voltage to increase towards its open circuit value. The resistance of the system increases until the current-generating capability of the solar cells is exactly that required by the electrical load and battery.

In describing the charge control circuit operation, let us assume that the solar cells are not illuminated and no current output is being produced by them. The base 43 of left-hand transistor of stage 18 is biased at a particular voltage from resistor 38. The direction of current flow through resistors 16 and 17 is such that the right-hand transistor is biased to cutoff, and therefore the collector 44 of the right-hand transistor of stage 18 will be at a more positive potential than the collector of the left-hand transistor. This difference in potential between the left-hand collector 44 and the right-hand collector 45 of stage 18 is applied across the emitter 46 to base 47 of transistor 25 causing the transistor 25 to conduct which biases transistor 26 to provide high current gain to drive the Darlington configuration of transistors 31, 32 and 33 into conduction. The resistor 51 of collector 26 is chosen so that the transistors 31 and 32 in parallel are heavily saturated. As the solar cells receive illumination from the sun, the voltage supply of the solar cell increases and eventually begins to exceed the battery voltage of cells 14 and 15. Current will flow from the solar cells through the saturated transistors 31 and 32 and through the battery and sampling resistors 16 and 17. As the current through sampling resistors 16 and 17 increases the right-hand base 42 of stage 18 reaches a particular voltage which decreases the voltage difference between the collectors 44 and 45 of stage 18 which cuts down the conduction through transistor 25. The decrease in current through transistor 25 reduces the bias on transistor 26 causing a decreased current flow in transistors 26 and 33 which causes transistors 31 and 32 in parallel to come out of saturation. As the voltage from the solar cell increases still further, transistors 31 and 32 act as resistors whose value is exactly that required to limit the current flowing into the battery to 500 ma.

It has been found by experience that surges of voltage in current resulting from certain procedures employed in connecting and disconnecting the regulator from batteries and power sources can cause high dissipation in transistor 25. The high current appears when transistor 25 attempts to charge stabilizing capacitor 52 instantaneously at the initiation of the above mentioned transients. In order to protect transistor 25, a resistor 53 is connected in series with its collector 54 thereby limiting the current into capacitor 52. The addition of this resistor 53 does not greatly affect the operation of transistor 25 nor does it influence the stability analysis appreciably since transistor 25 has a high output resistance in normal operation.

Stage 19 in conjunction with resistors 38, 39, 40 and 41 provide a limit control on the battery charge current in relationship with the temperature difference between the satellite structure and battery. To vary the battery charge current, the limit control circuit 19 changes the reference voltage at the base 43 of a differential amplifier 18.

Referring to the limit control circuit of stage 19, as shown in FIG. 1, the left-hand and right-hand transistors 61 and 62 of stage 19 are the active elements in a Schmitt trigger circuit. Temperature-sensing thermistors 36 and 37 are located on the structure and battery, respectively, of the satellite. Voltage divider 41, 63, and 40 is chosen so that with the battery-structure differential temperature zero, transistor 61 is on and transistor 62 is off. Under this condition, the voltage fed to the reference base 43 of differential amplifier 18 from the tapped point of resistance 38 has some positive value corresponding to the desired value of maximum charge current. As the battery temperature rises above that of the structure, the base voltage on transistor 61 becomes negative and at some temperature difference set by resistance 40, the circuit flips to the opposite state with transistor 61 off and transistor 62 on. The voltage on collector 64 of transistor 62 drops as does the reference base voltage at the tap of resistance 38. This condition corresponds to the desire of minimum value of battery charge current. At the minimum charge rate, the battery cools and at some lower temperature the limit control circuit 19 again flips to the higher charge current condition. Resistor 41 provides the temperature hysteresis required between the low and high states of battery charge current to guard against "hunting." The supply voltages for stage 19 are regulated by resistors 20, 23 and diodes 21 and 22 since a variation in the supply voltages for stage 19 can have a serious effect on the maximum and minimum charge rates.

The alignment procedure for the limit control circuit of stage 19 is as follows: With the tap point of resistor 38 connected to the reference base 43 of differential amplifier 18, the limit circuit 19 is biased into the high current mode at the base of transistor 61. Resistor 38 is adjusted for the maximum desired battery charge current. Transistor 62 is biased into conduction and then resistor 39 is adjusted for the minimum desired charge current. This process is repeated several times for there is some inner action between the high and low charge level adjustments. The desired temperature differential is applied to the two thermistors 36 and 37 and resistor 40 is adjusted to put the switching points at this temperature. Finally, resistor 41 is selected for the desired high-low current hysteresis. The effect of the adjustments in the various resistors is shown on the graph of FIGURE 2.

Obviously many modifications and variations of the present invention are possible in the light of the above teachings. It is therefore to be understood that within the scope of the appended claims the invention may be practiced otherwise than as specifically described.

What is claimed is:
1. A charge control system for a satellite comprising:
   charge storage means;
   amplifying means connected to said charge storage means for receiving a voltage determined by the charging current through said storage means and for comparing said received voltage with a predetermined reference voltage, said reference voltage being indicative of a predetermined required charging current for said charge storage means;
   means connected to said amplifying means for sampling the amplified voltage difference between said received voltage and said reference voltage and providing a DC voltage indicative of said amplified voltage difference;
   means connected to said sampling means for providing a current gain indicative of said DC voltage level;
   variable resistance means connected to said charge storage means and to said current gain means, said current gain means driving said variable resistance means for limiting the current through said charge storage means by changing the resistance of said variable resistance means;
voltage divider means;
temperature-sensing thermistors with high negative temperature coefficient; and
a pair of transistor elements connected to said thermistors and to said voltage divider means for providing alternative states of conduction for said transistor elements relative to the temperature difference between said thermistors for applying alternative established reference voltages to said amplifying means indicative of maximum and minimum values of charge current to said charge storage means.

2. A charge control system for a satellite comprising:
charge storage means;
amplifying means connected to said charge storage means for receiving a voltage determined by the charging current through said storage means and for comparing said received voltage with a predetermined reference voltage, said reference voltage indicative of a predetermined required charging current for said charge storage means;
means connected to said amplifying means for sampling the amplified voltage difference between said received voltage and said reference voltage and providing a DC voltage level indicative of said amplified voltage difference;
means connected to said sampling means for providing a current gain indicative of said DC voltage level;
variable resistance means connected to said charge storage means and to said current gain means, said current gain means driving said variable resistance means for limiting the current through said charge storage means by changing the resistance of said variable means;
limited control means for changing said established reference voltage when applied to said amplifying means for lowering the maximum charging current for said charge storage means in relationship between the temperature of the satellite and said storage means; and
regulated voltage means connected across said storage means, said amplifying means, and said limit control means for maintaining the biasing voltages on said amplifying means and said limit control means thereby limiting any variations in the maximum and minimum rates of changing current.

3. The charge control system for satellites of claim 2 further including a variable power source connected to said variable resistance means comprising:
solar cells exhibiting very high power when said cells are illuminated by the sun and minimum power when the cells are eclipsed by the earth, said control system limiting the maximum charging to said charge storage means from said solar cells and maintaining overcharge power of said charge storage means to a constant level providing constant temperatures for said charge storage means.

References Cited
UNITED STATES PATENTS

| | | | |
|---|---|---|---|
| 3,176,210 | 3/1965 | Bethke | 320—40 |
| 3,226,623 | 12/1965 | Krueger et al. | 320—39 X |
| 3,261,988 | 7/1966 | Johnson | 307—88.5 |
| 3,305,725 | 2/1967 | Huge et al. | 320—39 X |

JOHN F. COUCH, *Primary Examiner.*

S. WEINBERG, *Assistant Examiner.*